3,226,356
CROSSLINKING PROCESS
Clifton L. Kehr, Ednor, and James L. Guthrie, Laurel, Md., assignors to W. R. Grace & Co., a corporation of Connecticut
Filed Oct. 24, 1962, Ser. No. 232,771
8 Claims. (Cl. 260—41)

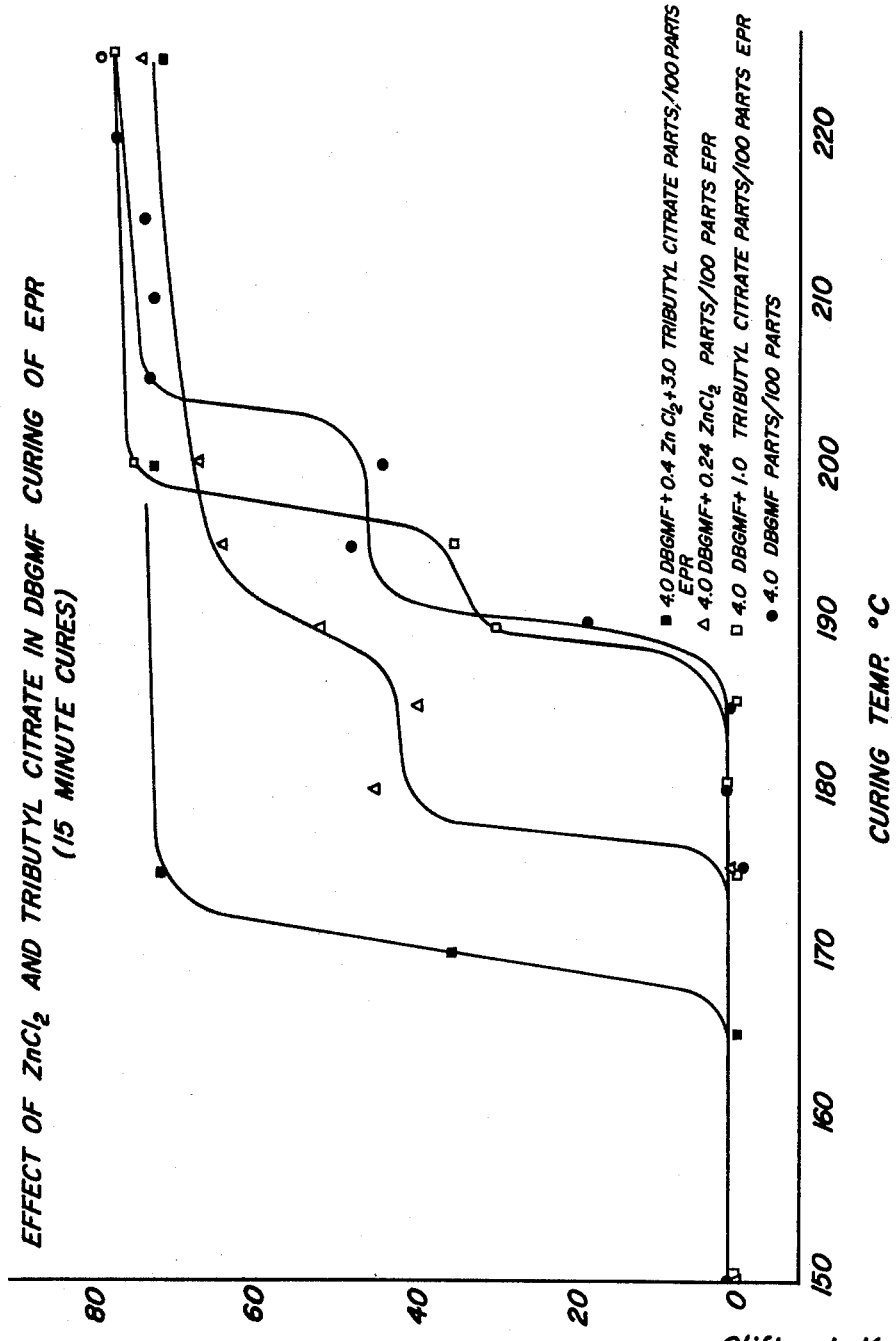

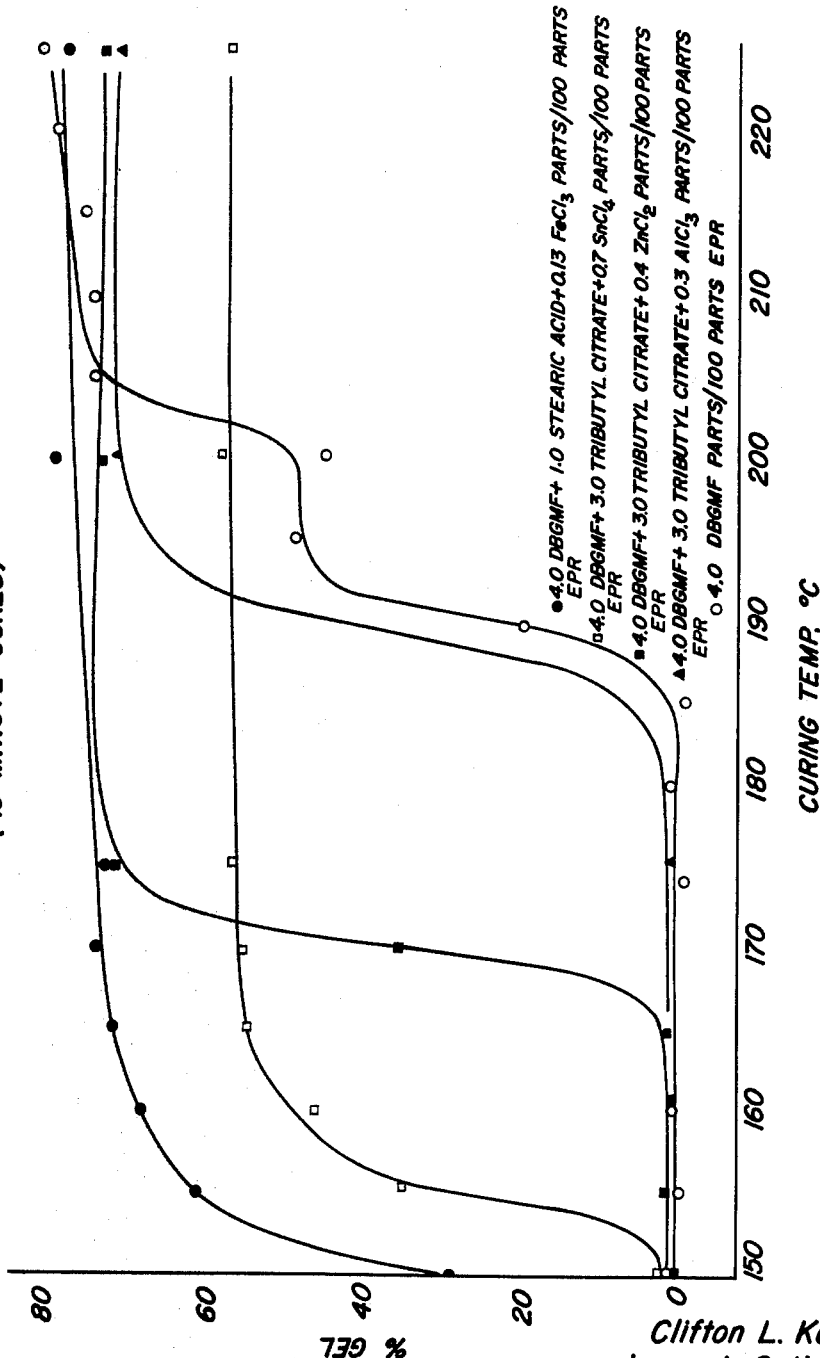

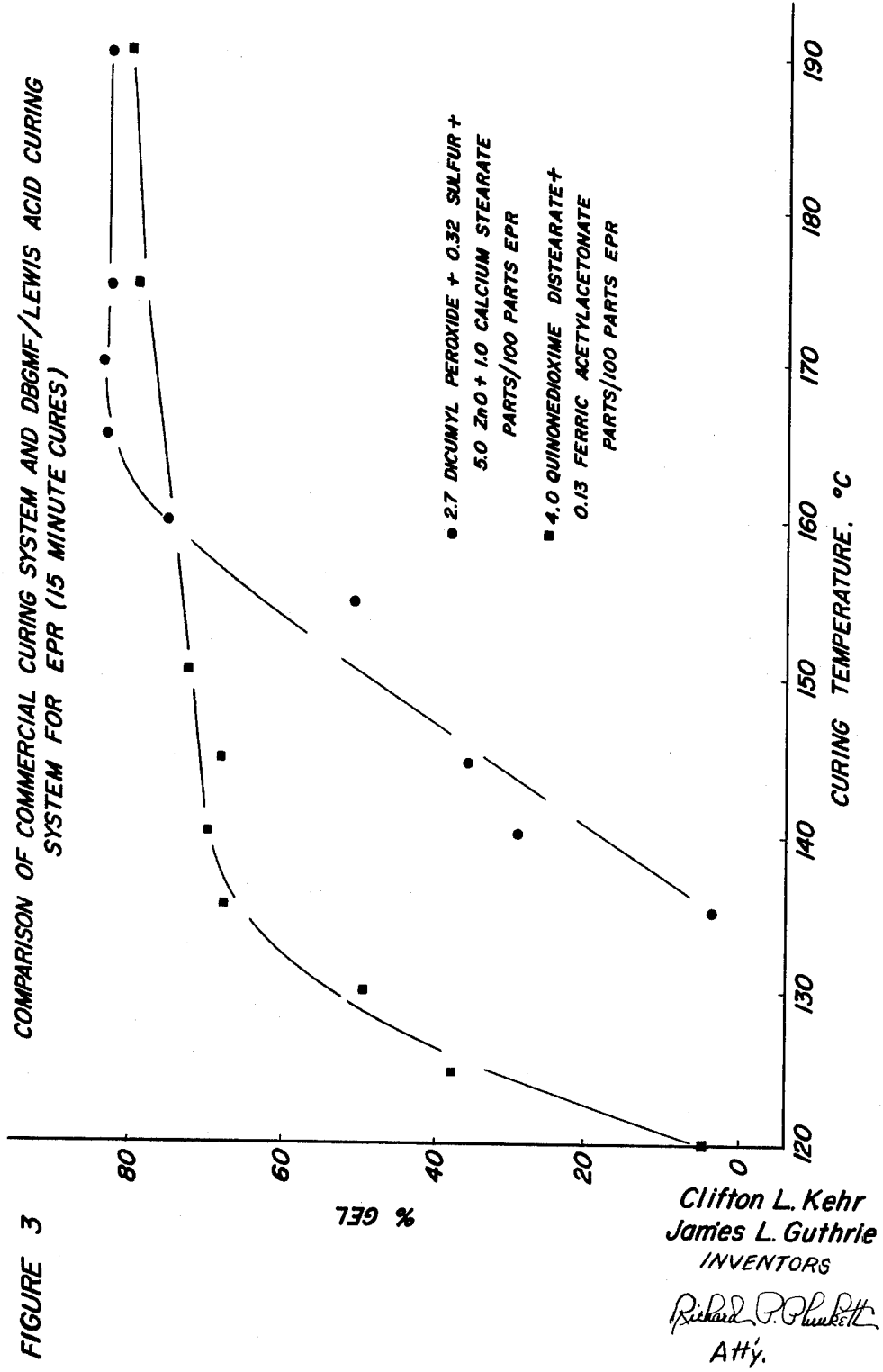

This invention relates to crosslinked polymers derived from α-olefins and copolymers containing same and methods of preparing same. More particularly this invention is concerned with crosslinking polymers derived from α-olefins and copolymers containing same at temperatures above their processing temperature at a rapid rate with a novel cross-linking system.

In the field of polymers derived from α-olefins, there is a continuing search for new and better cross-linking agents. Of special interest are those which are unreactive at processing and compounding temperatures, but which can be "triggered" in some manner after the polymer compound is processed into its final shape by molding, extruding or the like.

Thus in the polyolefin art, there has been a long felt want for crosslinking agents which not only crosslink at operable and economical temperatures above the processing temperature of the polymer or copolymer but also crosslink at a rapid rate at said temperature so as to require a very short cure time.

In a copending application having Serial Number 168,025, filed Jan. 18, 1962 and assigned to the same assignee, it has been discovered that esters, both mono and di, of quinone dioxime are excellent crosslinking agents for normally solid polyolefins. The only drawback, however, is that the curing temperature is necessarily high, e.g. for polypropylene a temperature of 225° C. is necessary to obtain a sufficiently high gel content in the polymer. Thus although the esters of quinone dioxime have excellent "scorch" (pre-cure) resistance at the high temperatures (175-200° C.), such exceptional stability is not required, in fact, is not desired in curing certain polymers derived from α-olefins and copolymers containing same.

For example a copolymer derived from α-olefins which has recently entered the market on a commercial scale is the poly α-olefin copolymer, ethylene/propylene rubber (EPR). Because of low monomer cost, EPR promises to be the rubber industry's lowest priced elastomer. Due to its essentially nil double bond content, EPR is outstanding (relative to other vulcanizable elastomers) in its resistance to degradation by oxygen and ozone. For the same reason, however, EPR is rather difficult to vulcanize. For example, ethylene/propylene rubber cannot be vulcanized with standard sulfur/accelerator receipes. Commercial manufacturers of EPR currently recommend a dicumyl peroxide vulcanization recipe (usually modified with a small quantity of sulfur to minimize degradation of the EPR during the cure). This system, although operable, has the following disadvantages: (1) obnoxious odors from a combination of acetophenone and mercaptan-like sulfur compounds, (2) high temperature/time curing cycles which are rather inflexible since there are no known accelerators or retarders for peroxides, and (3) the adhesion of the cured EPR to tire cords is extremely poor.

One commercial approach taken to overcome the disadvantages of EPR has been the development of a sulfurcurable hydrocarbon rubber based on ethylene and propylene. This product contains, beside ethylene and propylene, a third monomer unit derived from a nonconjugated diene and is sold under the tradename Nordel by E. I. du Pont de Nemours and Co., Inc. The resulting terpolymer after polymerization contains a controlled degree of unsaturation which as in the case of butyl rubber, serves as curing sites for vulcanization with standard sulfur-containing accelerators. Although the odor problem is less critical by the use of this terpolymer, the curing rate is still sluggish requiring a cure of approximately 30 minutes at 160° C. By ordinary rubber industry standards, these conditions are too long and too high to be economical for general usage, especially in the tire industry.

The rubber tire industry generally desires a standard curing temperature range of 130-150° C. for a period of no more than 10-20 minutes. At processing temperatures below said range, the crosslinking or vulcanizing agents employed must be relatively non-scorchy but when heated within said range the crosslinking agents must be able to rapidly cure the polymer. To employ crosslinking agents which cure at temperatures above the aforementioned range would be uneconomical for the rubber tire industry as it would necessitate in many instances the introduction of higher pressure steam generating units and a redesign of present equipment to withstand the higher steam pressure.

Therefore, one object of this invention is to provide a novel crosslinking system which effects curing of polymers derived from α-olefins and copolymers containing same, especially amorphous copolymers such as EPR, in the range 130-150° C. at an operable rate without "scorching" (pre-curing during processing). In fact, this novel crosslinking system is so versatile in the case of EPR that one can, by proper choice of curing agent and accelerator, formulate compositions so that rapid and complete crosslinking will occur at any predesired temperature ranging between the limits of 130° C. and 215° C. In addition, temperatures can be selected readily so that curing cycles of extremely short duration, e.g. 2 minutes or less, can be achieved.

Still another object of the present invention is to provide a class of synergistic agents which when combined with the crosslinking agents and accelerators therefor of this invention lower the curing temperature still further.

Other objects and advantages of this invention will become apparent from a reading hereinafter.

Summarily this invention relates to curing polymers derived from α-olefins by admixing said polymers with a curing agent of the general formula,

wherein R is a member of the group consisting of benzoate, and an aliphatic acyloxy group containing 1-20 carbon atoms and an accelerator for said curing agent comprising a Lewis acid or a Lewis acid precurser and heating said admixture to effect curing.

As used herein the term "α-olefin" means a hydrocarbon monomer which contains a single terminally unsaturated grouping of the formula —CH=CH$_2$.

As used herein the term "polymers derived from α-olefins" includes co- and terpolymers wherein at least 50 mole percent of the polymer is derived from α-olefins as herein defined. Thus, polymers derived from α-olefins would include, but are expressly not limited to, polyethylene, polypropylene, ethylene/propylene copolymers, ethylene/butylene copolymers, ethylene/propylene/diene terpolymers, and ethylene/vinyl acetate copolymers, said latter two containing at least 50 mole percent of the poly α-olefins. The polymers derived from α-olefins as meant herein would also include polymers derived from α-olefins which had been further processed such as having been chlorosulfonated, e.g. chlorosulfonated polyethylene as described in U.S. 2,212,786.

In this invention the term "acyloxy" means

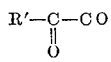

in which R' is an aliphatic group.

Substituents may be present in the ortho, meta and para positions of the benzene ring of the benzoate group of the curing agent. Substituents such as halogens, alkyl groups, alkoxy groups, nitro groups, etc. are operable. Also operable are other aromatic groups besides the benzenoid ring. For example, quinone dioxime esters of 1- or 2-naphthoic acid function as well as similar esters of benzoic acid but in most cases are more costly. The quinone dioxime esters of the aliphatic carboxylic acids, i.e. the aliphatic acyloxy-substituted quinone dioximes are also operable in substituted form. Substituents such as the halogens have been employed as will be shown hereinafter.

In the present invention the term "Lewis acid" means a substance which can fill the valence shell of one of its atoms with an unshared pair of electrons from another molecule. Examples of Lewis acids include but are not limited to $AlCl_3$, $FeCl_3$, $SnCl_4$, $ZnCl_2$, $TiCl_4$, $CrCl_3$, $VCl_4$, $AlBr_3$, $HgCl_2$, $BF_3$ and the like. Also included in this definition are mixtures of compounds which, when brought together in the polymeric composition under standard conditions of processing interact with each other to generate the Lewis acid in situ. Also included in the definition of Lewis acids herein are Lewis acid coordination compounds which prior to addition to the rubber compound have their maximum coordination number satisfied, but which in the course of compounding and curing interact with the curing agent. Examples of this latter type of Lewis acid coordination complexes are illustrated by but not limited to ferric acetylacetonate, aluminum acetylacetonate, boron fluoride, n-butyl etherate, zinc chloride: 2,2-dithiobisbenzothiazole complex and the like. The addition of said Lewis acid accelerators to the system causes optimum curing to occur (as shown by gel content of the polymer), at temperatures below the optimum curing temperature of the esters of quinone dioxime per se as will be shown hereinafter.

In addition it has been found that the optimum curing temperature of the novel curing agents and accelerators of the instant invention can, if desired, be lowered still further by adding to the system a synergistic agent consisting of a polar organic member of the group consisting of carboxylic acids, phosphoric acid, boric acid, and esters thereof. Examples of synergistic agents operable in the instant invention include, but are not limited to, n-butyl stearate, tributyl citrate, tributyrin, tributyl phosphate, tributyl borate, stearic acid, and the like.

The amount of crosslinking agent used in this invention is not critical and can vary over wide limits depending upon the polymer being crosslinked. Amounts of esters of quinone dioxime crosslinking agent in the range 0.1–30 parts per hundred parts of polymer by weight preferably 0.5–20 parts per hundred parts of polymer are employed.

The amount of Lewis acid accelerator used is in the range 0.005–1.0 part by weight per hundred parts of polymer and preferably 0.01–0.5 part on the same basis. The Lewis acid accelerator may, if desired, be added to the compounding step as a solution (5–20% by weight) in suitable solvents, for ease of handling and for uniformity of dispersion. Low boiling organic solvents such as acetone, isopropanol, ethanol, benzene, and the like are operable. The solvent is boiled off in the compounding step.

The amount of synergistic agent employed herein is in the range 0.1–30 parts per hundred parts of polymer by weight and preferably 0.5–3.0 parts on the same basis.

The polymer compositions to be cured in accord with the present invention may, if desired, include such additives as antioxidants, fillers, pigments, anti-static agents, extending oils, plasticizers, tackifiers and the like within the scope of this invention. Such additives are usually but not necessarily added to the polymer composition by pre-blending prior to or during the compounding step. Operable fillers would include carbon black, clay, silica, alumina, carbonates, oxides, hydroxides, silicates, diatomaceous earth, talc, kaolin, barium sulfate, calcium sulfate, calcium carbonate and the like. The aforesaid additives may be present up to 200 parts or more per 100 parts of polymer by weight and preferably 0.05–100 parts on the same basis.

Although the invention is operable with polymers derived from α-olefins and copolymers containing same, for ease of explanation and clarity the invention will, in the main, be explained using ethylene/propylene rubber (EPR) as the polymer to be cured.

The general procedure followed in performing this invention is to form a compound of the desired ingredients in a Banbury mixer, two-roll mill, Brabender Plastograph and the like at temperatures in the range 25–200° C. The compounding temperature is determined by and is in excess of the softening point of the polymer but is below the curing temperature exhibited by the crosslinking agent. While milling the polymer above its softening point (which for EPR usually would be in the range 25–120° C.), any filler and any synergistic agent are compounded in with continued milling. The crosslinking agent is then added followed by the addition of the Lewis acid accelerator. It is possible to add all the aforementioned components together to the softened polymer but for more uniform mixing and ease of handling, they are preferably added stepwise. The resulting compound is then processed into its final shape by an extruding or molding step under pressure at temperatures above the softening point of the polymer but below the curing temperature exhibited by the crosslinking agent. This step is followed by heating the shaped article to a higher temperature range, e.g. for EPR a temperature in excess of 130° C. whereat rapid curing of the polymer is effected. The curing temperature is dependent upon many factors, including (1) the polymer being cured, (2) the actual crosslinking agent and accelerator within the classes disclosed and the amounts thereof, and (3) whether or not a synergistic agent is added. As a general rule the curing temperature employed for optimum curing, i.e. where the state of cure (percent gel) plateaus out, in the instant invention is from 120 to 200° C.

The following examples are set down as an aid in understanding the invention but are expressly not designed to limit its scope. In the example, unless otherwise noted, all parts and percentages are by weight per hundred parts of polymer.

Throughout the instant invention the melt indices (MI) were measured under the conditions specified in ASTMD 1238–52T, except for isotactic polypropylene, in which instance the procedure was modified so that the test was run at 230° C. instead of 190° C. The densities of the polymers were measured under the conditions specified in ASTMD 1505–57T. The percent gel content of the polymers in the instant invention was measured by refluxing a weighed sample (approximately 0.5 g.) of polymer in a cellulose Soxhlet thimble in a suitable solvent (containing 0.3 weight percent 2,6-ditertiary-butyl-4-methyl-phenol commercially available under the tradename Ionol from Shell Oil Corp. for 24 hours. The insoluble portion of the polymer sample after drying was weighed to calculate percent gel as follows:

$$\text{percent gel} = \frac{\text{weight insoluble sample}}{\text{total weight sample}} \times 100$$

In examples wherein an additive such as a filler, e.g. carbon black, clay and the like was present in the compound the percent gel content was calculated so as to exclude the inert insoluble additive. Thus as used herein percent gel content is based solely on the polymeric hydrocarbon content of the cured polymer. Suitable solvents for the polymer compositions described herein include heptane, xylene, methylethyl ketone and the like, the only restriction being that the uncured polymer should be completely soluble in said solvent under conditions of the extraction procedure.

Mooney viscosity was measured in accord with the conditions specified in ASTMD-1646-61.

In all examples, unless otherwise noted, a Brabender Plastograph model PL–V2 equipped with a recording unit for measuring changes in torque was used for compounding. The compounded product was premolded into film samples of approximately 20 mils thickness by pressing at temperatures below the curing temperature for short intervals of time. These premolded film samples of 20 mil thickness were then cut into smaller strips of approximately 1.5 g. weight and then cured in a Pasadena Platen Press at a pressure of 500–1000 p.s.i. for periods ranging from 1 to 15 minutes at various curing temperatures. The samples were then removed from the press and cooled in air. Samples of the cured specimens were then used to calculate the percent gel content by the aforementioned solvent extraction method.

Table I shows a comparative study of the accelerating effect of various Lewis acid accelerators and synergistic agents on the crosslinking agent in curing ethylene/propylene rubber (EPR). The compounding was performed in a Brabender Plastograph at 80–110° C. The components of the compound were milled together over a period of 10 minutes. Samples of the compounded EPR were cured by placing them in a 6″×6″×0.02″ mold and pressing them in a platen press for 15 minutes and 625 p.s.i at varying cure temperatures. Weighed samples of the cured EPR were then measured for gel content in refluxing n-heptane containing a small amount of an antioxidant for 24 hours.

TABLE I

| Example No | 1266 27-1 | 1450 12-9 | 1450 12-4 | 1450 12-22 | 1450 12-19 | 1450 12-16 | 1450 12-24 | 1450 12-21 | 1450 12-18 | 1387 30-1 | 1450 11-8 | 1450 12-1 |
|---|---|---|---|---|---|---|---|---|---|---|---|---|
| Compound a | 1 | 2 | 3 | 4 | 5 | 6 | 7 | 8 | 9 | 10 | 11 | 12 |
| Polymer b | 100 | 100 | 100 | 100 | 100 | 100 | 100 | 100 | 100 | 100 | 100 | 100 |
| Crosslinking Agent: | | | | | | | | | | | | |
| Quinonedioxime Dibenzoate | 4.0 | 4.0 | 4.0 | | | | | | | | | |
| Quinonedioxime bis(p-methoxybenzoate) | | | | 4.8 | 4.8 | 4.8 | | | | | | |
| Quinonedioxime bis(p-chlorobenzoate) | | | | | | | 4.9 | 4.9 | 4.9 | | | |
| Quinonedioxime Distearate | | | | | | | | | | 7.9 | 7.9 | 7.9 |
| Quinonedioxime Diheptanoate | | | | | | | | | | | | |
| Quinonedioxime Dibutyrate | | | | | | | | | | | | |
| Quinonedioxime Diacetate | | | | | | | | | | | | |
| Quinonedioxime bis(chloroacetate) | | | | | | | | | | | | |
| Lewis acid accelerator: | | | | | | | | | | | | |
| FeCl₃ | | 0.033 | 0.033 | | 0.033 | 0.033 | | 0.033 | 0.033 | | 0.033 | 0.033 |
| AlCl₃ | | | | | | | | | | | | |
| ZnCl₂ | | | | | | | | | | | | |
| SnCl₄.5H₂O | | | | | | | | | | | | |
| Ferric acetylacetonate | | | | | | | | | | | | |
| Synergistic Agent: | | | | | | | | | | | | |
| Stearic acid | | | 1.0 | | | 1.0 | | | 1.0 | | | 1.0 |
| Tributyl citrate | | | | | | | | | | | | |
| Tributyl borate | | | | | | | | | | | | |
| Tirbutyl phosphate | | | | | | | | | | | | |
| Percent gel of cured polymer at c | | | | | | | | | | | | |
| 125° C | | 1 | 1 | 2 | 3 | 2 | 4 | 4 | 4 | 1 | 41 | 27 |
| 150° C | | 1 | 32 | 1 | 2 | 29 | 4 | 2 | 2 | 0 | 73 | 69 |
| 175° C | 0 | 73 | 78 | 2 | 60 | 77 | 3 | 55 | 73 | 54 | 77 | 73 |
| 200° C | 54 | 82 | 81 | 66 | 81 | 83 | 39 | 79 | 81 | 61 | 78 | 77 |
| 225° C | 82 | 86 | 85 | 79 | 78 | 82 | 73 | 83 | 81 | | 86 | 79 |

| Example No | 1387 39-16 | 1450 11-9 | 1450 12-6 | 1450 12-11 | 1450 12-7 | 1450 12-2 | 1450 12-13 | 1450 12-10 | 1450 12-5 | 1450 12-12 | 1450 12-8 | 1450 12-3 |
|---|---|---|---|---|---|---|---|---|---|---|---|---|
| Compound a | 13 | 14 | 15 | 16 | 17 | 18 | 29 | 10 | 21 | 22 | 23 | 24 |
| Polymer b | 100 | 100 | 100 | 100 | 100 | 100 | 100 | 100 | 100 | 100 | 100 | 100 |
| Crosslinking Agent: | | | | | | | | | | | | |
| Quinonedioxime Dibenzoate | | | | | | | | | | | | |
| Quinonedioxime bis(p-methoxybenzoate) | | | | | | | | | | | | |
| Quinonedioxime bis(p-chlorobenzoate) | | | | | | | | | | | | |
| Quinonedioxime Distearate | | | | | | | | | | | | |
| Quinonedioxime Diheptanoate | 4.3 | 4.3 | 4.3 | | | | | | | | | |
| Quinonedioxime Dibutyrate | | | | 3.5 | 3.3 | 3.3 | | | | | | |
| Quinonedioxime Diacetate | | | | | | | 2.4 | 2.4 | 2.4 | | | |
| Quinonedioxime bis(chloroacetate) | | | | | | | | | | 3.5 | 3.5 | 3.5 |
| Lewis acid accelerator: | | | | | | | | | | | | |
| FeCl₃ | | 0.033 | 0.033 | | 0.033 | 0.033 | | 0.033 | 0.033 | | 0.033 | 0.033 |
| AlCl₃ | | | | | | | | | | | | |
| ZnCl₂ | | | | | | | | | | | | |
| SnCl₄.5H₂O | | | | | | | | | | | | |
| Ferric acetylacetonate | | | | | | | | | | | | |
| Synergistic Agent: | | | | | | | | | | | | |
| Stearic acid | | | 1.0 | | | 1.0 | | | 1.0 | | | 1.0 |
| Tributyl citrate | | | | | | | | | | | | |
| Tributyl borate | | | | | | | | | | | | |
| Tributyl phosphate | | | | | | | | | | | | |
| Percent gel of cured polymer at c | | | | | | | | | | | | |
| 125° C | 0 | 1 | 1 | 0 | 1 | 1 | 0 | 1 | 0 | 1 | 1 | 1 |
| 150° C | 0 | 76 | 72 | 0 | 63 | 69 | 0 | 1 | 36 | 0 | 1 | 0 |
| 175° C | 48 | 82 | 68 | 43 | 77 | 80 | 33 | 66 | 69 | 1 | 6 | 3 |
| 200° C | 48 | 84 | 83 | 51 | 77 | 83 | 56 | 69 | 74 | | 24 | 35 |
| 225° C | | | 85 | 63 | 84 | 87 | 66 | 70 | 81 | 41 | 50 | 43 |

See footnotes at end of table.

| Example No. | 1387 7-11 | 1387 23-3 | 1387 23-5 | 1387 23-7 | 1007 38-18 | 1450 12-15 | 1007 38-17 | 1387 38-8 | 1387 7-15 | 1266 31-3 | |
|---|---|---|---|---|---|---|---|---|---|---|---|
| Compound a | 25 | 26 | 27 | 28 | 29 | 30 | 31 | 32 | 33 | 34 | 35 |
| Polymer b | 100 | 100 | 100 | 100 | 100 | 100 | 100 | 150 d | 100 | 100 | 150 e |
| Crosslinking Agent: | | | | | | | | | | | |
| Quinonedioxime Dibenzoate | 4.0 | 4.0 | 2.0 | 8.0 | 4.0 | | 4.0 | | 4.0 | 4.0 | 4.0 |
| Quinonedioxime bis(p-methoxybenzoate) | | | | | | | | | | | |
| Quinonedioxime bis(p-chlorobenzoate) | | | | | | | | | | | |
| Quinonedioxime Distearate | | | | | | 4.0 | | 5.3 | | | |
| Quinonedioxime Dipheptanoate | | | | | | | | | | | |
| Quinonedioxime Dibutyrate | | | | | | | | | | | |
| Quinonedioxime Diacetate | | | | | | | | | | | |
| Quinonedioxime bis(chloroacetate) | | | | | | | | | | | |
| Lewis acid accelerator: | | | | | | | | | | | |
| $FeCl_3$ | 0.2 | 0.12 | 0.12 | 0.12 | | | | 0.06 | | | 0.25 |
| $AlCl_3$ | | | | | | | | | | 0.28 | |
| $ZnCl_2$ | | | | | | 0.24 | | | | | |
| $SnCl_4 \cdot 5H_2O$ | | | | | | | | | 0.2 | | |
| Ferric acetylacetonate | | | | | | | 0.26 | | | | |
| Synergistic Agent: | | | | | | | | | | | |
| Stearic acid | | | | | 6.8 | | 6.8 | | 1.0 | | 1.0 |
| Tributyl citrate | 3.1 | | | | | | | | | 4.7 | |
| Tributyl borate | | | 0.87 | | | | | 0.72 | | | |
| Tributyl phosphate | | | | 1.0 | 1.0 | | | | | | |
| Percent gel of cured polymer at c | | | | | | | | | | | |
| 125° C | | | | | | 36 | | 42 | | | |
| 150° C | 37 | 39 | 3 | 2 | 2 | 73 | 1 | 57 | 0 | 1 | 34 |
| 175° C | 63 | 70 | 23 | 83 | 70 | 77 | 2 | 62 | 38 | 2 | 41 |
| 200° C | 63 | 73 | | 85 | 72 | 80 | 68 | 65 | 79 | 72 | 45 |
| 225° C | 62 | 75 | | 85 | 71 | | 74 | | 80 | 72 | 47 | a Compound admixed in a Brabender Plastograph at 80–110° C. for 5 minutes.
b Ethylene/propylene rubber (E.P.R.) containing 58±5 mole percent ethylene. Mooney viscosity ML (212° F) =42.
c 15 minute curing time. E.P.R. percent gels measured after refluxing sample for 24 hours in n-heptane containing 0.3 weight percent, 2,6-ditertiary-butyl-4-methyl-phenol.
d 100 parts ethylene/propylene rubber containing 58±5 mole percent ethylene admixed with 50 parts Sterling MT carbon black.
e 100 parts ethylene/propylene rubber containing 58±5 mole percent ethylene admixed with 50 parts Spheron 9 carbon black.

As is readily seen in Table I, the addition of a Lewis acid accelerator to the curing agent of this invention causes curing at a lower temperature range than the crosslinking agent per se; compare, e.g. compounds 1 and 2 or 4 and 5 and the like. In addition it is to be noted that the addition of a synergistic agent to the compound causes curing to occur at a still lower temperature than the combination of curing agent and accelerator; compare, e.g. compounds 2 and 3. The addition of the synergistic agent to the curing agent without any accelerator appears to give only a marginal improvement in lowering the curing temperature; compare compounds 1 and 31. However, when the accelerator is added to the curing system a substantial lowering of the curing temperature is obtained. This is readily apparent from FIGURE I which shows graphically the effect of a Lewis acid accelerator i.e. $ZnCl_2$ and a synergistic agent i.e. tributyl citrate on a curing agent, quinone dioxime dibenzoate (DBGMF) for ethylene/propylene rubber (EPR).

FIGURE II shows the accelerating effect of various Lewis acid accelerators on the curing agent, quinone dioxime dibenzoate (DBGMF) for curing EPR in the presence of various synergistic agents. In all cases, curing occurred at a lower temperature in the presence of an accelerator than occurs with solely a curing agent.

Table II shows a comparative study of the accelerating effect of the Lewis acid accelerators and synergistic agents on the crosslinking of various polymers derived from α-olefins. The compounding was performed during a 10 minute milling period in a Brabender Plastograph at temperatures ranging from 10–30 degrees centigrade above

TABLE II

| Example No. | 951 11-3 | 1450 1-3 | 951 25-3 | 1450 1-4 | 1450 31-1 | 1450 31-3 | 1007 28-12 | 1450 28-14 | 1450 1-5 | 1450 1-6 | 1450 1-7 | 1450 28-17 |
|---|---|---|---|---|---|---|---|---|---|---|---|---|
| Compound a | 36 | 37 | 38 | 39 | 40 | 41 | 42 | 43 | 44 | 45 | 46 | 47 |
| Polymeric Material | | | | | | | | | | | | |
| Polyethylene b | 100 | 100 | | | | | | | | | | |
| Polypropylene c | | | 100 | 100 | | | | | | | | |
| Ethylene/butylene copolymer d | | | | | 100 | 100 | | | | | | |
| Chlorosulfonated polyethylene e | | | | | | | 100 | 100 | | | | |
| Ethylene/propylene/diene terpolymer f | | | | | | | | | 100 | 100 | | |
| Ethylene/vinyl acetate copolymer g | | | | | | | | | | | 100 | 100 |
| Crosslinking Agent: | | | | | | | | | | | | |
| Quinone dioxime dibenzoate | 4.0 | 4.0 | 4.0 | 4.0 | 4.0 | 4.0 | 4.0 | 4.0 | 4.0 | 4.0 | 4.0 | 4.0 |
| Lewis Acid Accelerator: | | | | | | | | | | | | |
| $FeCl_3$ | | 0.10 | | 0.11 | | 0.10 | | 0.03 | | 0.12 | | |
| Ferric acetylacetonate | | | | | | | | | | | | 0.03 |
| Synergistic Agent: | | | | | | | | | | | | |
| Stearic acid | | | | | | | 1.0 | | 1.0 | | | 1.0 |
| Tributyl citrate | | 1.0 | | 1.0 | | | | | | 1.0 | | |
| Percent gel of cured polymer at h: | | | | | | | | | | | | |
| 150° C | 3 | 13 | | | 0 | 19 | 2 | 67 | 0 | 37 | 0 | 0 |
| 175° C | 0.6 | 50 | 0 | 29 | 0 | 49 | 67 | 75 | 1 | 75 | 1 | 69 |
| 200° C | 47 | 53 | 0.6 | | 43 | 53 | 79 | 86 | 79 | 77 | 62 | 74 |
| 225° C | 55 | 60 | 51 | | 55 | | 81 | 87 | | 76 | 67 | 77 | a Compound admixed in a Brabender Plastograph for 5–10 minutes. Rubbers milled at 80–110° C.; thermoplastic polymers milled at 15–25° C. above their melting point.
b Polyethylene; density 0.96 g./cc., melt index 0.7 and 137° C. melting point.
c Polypropylene; density 0.899 g./cc., melt index 4.4 and 172–173° C melting point.
d Ethylene/butylene copolymer containing 1.0 weight percent butylene; density 0.93 g./cc.
e Chlorosulfonated polyethylene rubber, specific gravity 1.12–1.28, sold under tradename "Hypalon 20", E. I. du Pont & Co., Inc.
f Ethylene/propylene/diene terpolymer rubber, specific gravity 0.85, sold under the tradename "ECD-330", E. I. du Pont & Co., Mooney viscosity ML (212° F.) =85.
g Ethylene/vinyl acetate copolymer containing 72 weight percent ethylene; density 0.95 g./cc. at 30° C, sold under the tradename "Elvax 250", E. I. du Pont & Co., Inc., melt index 15.
h 15 minute curing period. Percent gel measured after refluxing weighed sample for 24 hours in xylene for polyethylene, polypropylene, ethylene/butylene copolymer and ethylene/vinyl acetate copolymer; in methyl ethyl ketone for chlorosulfonated polyethylene and in n-heptane for ethylene/propylene/diene terpolymer. All refluxing solvents contain 0.3 weight percent 2,6-ditertiary-butyl-4-methyl phenol.

the softening point of the thermoplastic polymers and at 80–110° C. for the rubbers. Samples of the polymers were shaped into 6"×6"×0.02" tensile plaques in a platen press for 1 minute at 125–165° C., depending on the softening point of the thermoplastic polymer, and atmospheric pressure, followed by a 2 minute press at 125–165° C. and 625 p.s.i. pressure. The samples were removed from the mold and cured in a platen press for 15 minutes at 625 p.s.i. and varying curing temperatures. Weighed samples of the cured polymers derived from α-olefins were then measured for gel content in suitable refluxing solvents containing a small amount of an antioxidant for 24 hours. The rubbers in Table II were cured and measured for percent gel in the same manner as the EPR in Table I except that for chlorosulfonated polyethylene the solvent used was methyl ethyl ketone.

The results in Table II show the operability of the Lewis acid accelerators and the synergistic agents of this invention in lowering the curing temperature of the curing agent for various polymers derived from α-olefins.

FIGURE III shows a comparison of the curing system of the instant invention with the presently recommended commercial curing system for ethylene/propylene rubber (EPR) for 15 minute curing periods. The present commercially recommended curing system for EPR consists essentially of dicumyl peroxide with a small amount of sulfur to minimize degradation during the cure. Zinc oxide (ZnO) is added to create a neutral or basic environment for the dicumyl peroxide and calcium stearate is added as a processing aid to prevent scorch. From FIGURE III is it readily seen that the curing system of the instant invention causes curing to occur at a lower temperature and to a high degree within the preferred curing temperature range of 130–150° C. for EPR.

We claim:
1. A curable composition consisting essentially of 100 parts by weight of a polymeric material containing at least 50 mole percent of a polymer derived from an α-olefin, said polymeric material being selected from the group consisting of polyethylene, polypropylene, ethylene-butylene copolymer, chlorosulfonated polyethylene, ethylene, ethylene-vinyl acetate copolymer and ethylene-propylenediene terpolymer, 0.1 to 30 parts/100 parts of said polymeric material by weight of a curing agent of the general formula:

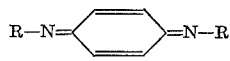

wherein R is a member of the group consisting of benzoate and an aliphatic acyloxy group containing 1 to 20 carbon atoms and 0.005 to 1.0 part/100 parts of said polymeric material by weight of a Lewis acid selected from the group consisting of $FeCl_3$, ferric acetylacetonate, $AlCl_3$, $ZnCl_2$ and $SnCl_4 \cdot 5H_2O$.

2. A curable composition consisting essentially of 100 parts by weight of a polymeric material containing at least 50 mole percent of a polymer derived from an α-olefin, said polymeric material being selected from the group consisting of polyethylene, polypropylene, chlorosulfonated polyethylene, ethylene-butylene copolymer, ethylene-vinyl acetate copolymer and ethylene-propylenediene terpolymer, 0.1 to 30 parts/100 parts of said polymeric material by weight of a curing agent of the general formula:

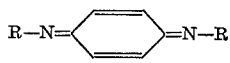

wherein R is a member of the group consisting of benzoate and an aliphatic acyloxy group containing 1 to 20 carbon atoms, 0.005 to 1.0 part/100 parts of said polymeric material by weight of a Lewis acid selected from the group consisting of $FeCl_3$, ferric acetylacetonate, $AlCl_3$, $ZnCl_2$ and $SnCl_4 \cdot 5H_2O$ and 0.1–30 parts/100 parts by weight of said polymeric material of a synergistic agent for curing said polymeric material consisting of a polar organic member of the group consisting of carboxylic acid, phosphoric acid, boric acid and esters thereof.

3. The method of curing polymeric material containing at least 50 mole percent of a polymer derived from an α-olefin, said polymeric material being selected from the group consisting of polyethylene, polypropylene, chlorosulfonated polyethylene, ethylene-butylene copolymer, ethylene-vinyl acetate copolymer and ethylene-propylenediene terpolymer comprising mixing together 100 parts by weight of said polymeric material, 0.1 to 30 parts/100 parts of said polymeric material by weight of a curing agent of the general formula:

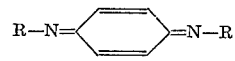

wherein R is a member of the group consisting of benzoate and an aliphatic acyloxy group containing 1 to 20 carbon atoms and 0.005 to 1.0 part/100 parts of said polymeric material by weight of a Lewis acid selected from the group consisting of $FeCl_3$, ferric acetylacetonate, $AlCl_3$, $ZnCl_2$ and $SnCl_4 \cdot 5H_2O$ and thereafter heating the resultant mixture to effect curing of said polymeric material.

4. The method according to claim 3 wherein a synergistic agent for curing said polymeric material consisting of a polar organic member of the group consisting of carboxylic acids, phosphoric acid, boric acid and esters thereof is added to the mixture prior to heating said mixture to effect curing of said polymeric material.

5. The composition according to claim 1 in which the composition contains in addition, 0.05 to 200 parts/100 parts of said polymeric material by weight of a filler for said polymeric material.

6. The composition according to claim 5 wherein the filler is carbon black.

7. The method according to claim 3 wherein 0.05 to 200 parts/100 parts of said polymeric material by weight of a filler for said polymeric material is added to the mixture prior to heating said mixture to effect curing of the polymeric material.

8. The method according to claim 7 wherein the filler is carbon black.

References Cited by the Examiner

UNITED STATES PATENTS

| | | | |
|---|---|---|---|
| 2,748,104 | 5/1956 | Viohl | 260—41 |
| 3,012,020 | 12/1961 | Kirk et al. | 260—41 |
| 3,093,614 | 6/1963 | MacKenzie et al. | 260—41 |

OTHER REFERENCES

Morton: "Introduction To Rubber Technology" Reinhold, New York, 1959, pages 323–324.

MORRIS LIEBMAN, *Primary Examiner.*

LESLIE H. GASTON, *Examiner.*

K. B. CLARKE, A. LIEBERMAN, *Assistant Examiners.*

UNITED STATES PATENT OFFICE
CERTIFICATE OF CORRECTION

Patent No. 3,226,356 December 28, 1965

Clifton L. Kehr et al

It is hereby certified that error appears in the above numbered patent requiring correction and that the said Letters Patent should read as corrected below.

Columns 5 and 6, TABLE I, under the heading "Example No. 1450 12-13", line 1, for "29" read -- 19 --; same table, under the heading "Example No. 1450 12-10", line 1, for "10" read -- 20 --; column 9, lines 41 and 42, strike out "ethylene,".

Signed and sealed this 25th day of October 1966.

(SEAL)
Attest:

ERNEST W. SWIDER
Attesting Officer

EDWARD J. BRENNER
Commissioner of Patents

Notice of Adverse Decision in Interference

In Interference No. 96,051 involving Patent No. 3,226,356, C. L. Kehr and J. L. Guthrie, CROSSLINKING PROCESS, final judgment adverse to the patentees was rendered Oct. 21, 1969, as to claim 3.

[*Official Gazette June 2, 1970.*]